Patented Oct. 5, 1926.

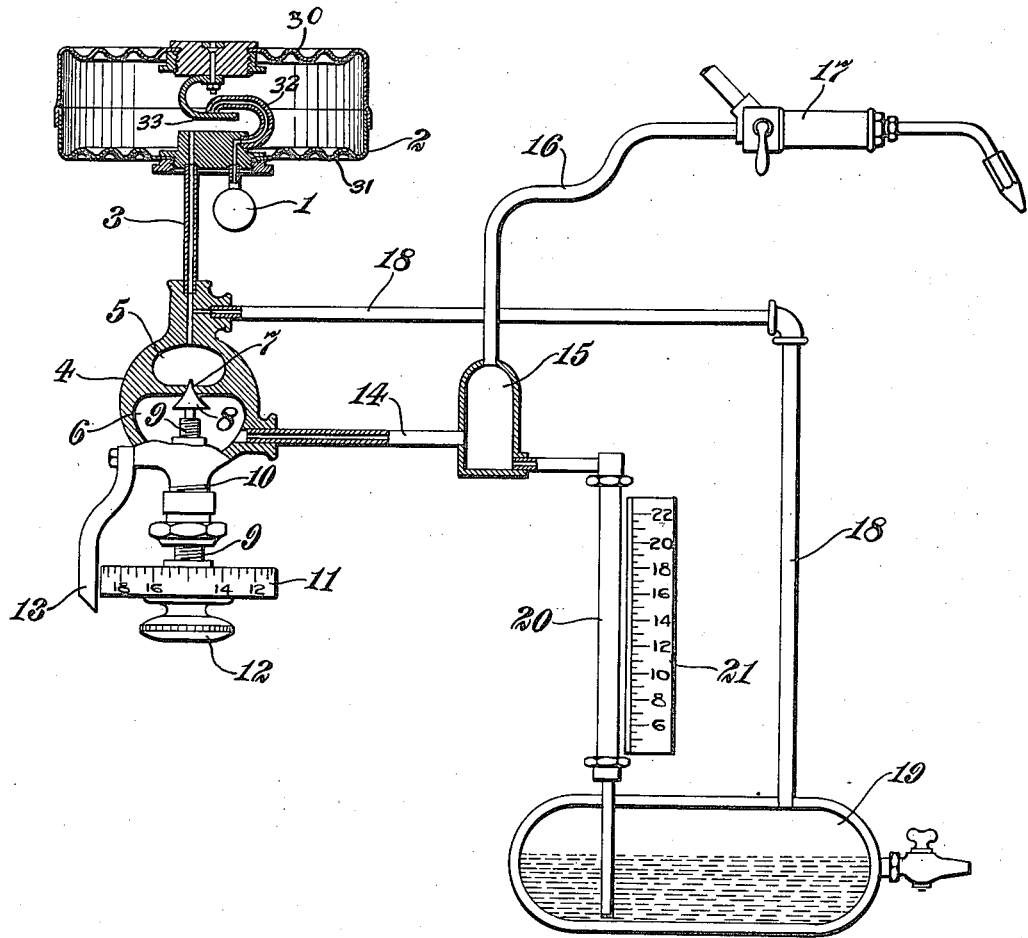

1,602,136

UNITED STATES PATENT OFFICE.

EDWARD C. WALKER, OF KINLOCK, MISSOURI, ASSIGNOR TO NATIONAL LEAD COMPANY, OF NEW YORK, N. Y., A CORPORATION OF NEW YORK.

FLOW METER.

Application filed November 8, 1920. Serial No. 422,682.

This invention relates to a device for indicating the rate of flow of the fluid. It has been designed more particularly for use in connection with the automatic welding machine described in the application Serial No. 85,795, filed March 22, 1916, wherein the movement of the welding tool is controlled by controlling the rate of flow of a fluid in a cylinder operatively connected with said tool.

One of the objects of this invention is to provide means indicating the rate of flow of a fluid so as to maintain said flow uniform.

Further objects will appear from the detail description taken in connection with the accompanying drawing, which shows in a somewhat diagrammatic form, one embodiment of this invention.

Referring now to the drawing, 1 designates the supply pipe by which the fluid, whose flow is to be regulated and indicated, is brought to the device. This may be the discharge pipe from the regulating cylinder of the apparatus described in the application mentioned above. The pipe 1 communicates with a regulating element comprising a chamber 2, the ends of which are formed into flexible diaphragms 30 and 31. The fluid enters the chamber 2 through the curved pipe 32. The terminal opening of the pipe 32 is normally closed by a valve plate 33 mounted upon the diaphragm 30. This valve closes the pipe 32 when fluid under pressure fills the chamber 2. This results from the expansion of the chamber 2 and the consequent separation of the flexible diaphragms 30 and 31 upon which the pipe 32 and the valve 33 are mounted. A flow of fluid from the chamber 2 by way of the pipe 3 will reduce the pressure in said chamber, thereby allowing the diaphragms 30 and 31 to approach each other, thus moving the valve 33 away from the end of the pipe 32 and allowing a further supply of fluid to enter. By this action, the pressure within the chamber 2 may be regulated and maintained uniform. From the regulating element, the fluid may be conducted as by means of a pipe 3 to a special valve 4 comprising a supply chamber 5 and a delivery chamber 6 separated by a wall in which there is an orifice 7 partially closed by a tapered plug 8 adjustably mounted on a screw shank 9 threaded in to the neck 10 of the valve 4 and carrying at its lower end, a circular adjusting scale 11 and an operating head 12. An index 13 for the scale 11 may be mounted on the valve body as shown. The fluid may be conducted from the delivery chamber 6 by means of a pipe 14 to a reservoir 15 and thence by means of the tube 16 to the utilizing device 17 shown in this case as an oxy-acetylene welding tool, the device being arranged for regulating the flow of gas.

The supply chamber 5 communicates by means of a pipe 18 with a liquid reservoir 19. The gas reservoir 15 also communicates through the gas tube 20 with the liquid reservoir 19 at a point below the surface of the liquid contained therein. This reservoir also serves to accumulate liquid which may be forced up from the tube 20 under excessive variations of pressure.

In operation, the pressure in the supply chamber 5 will be communicated to the reservoir 19 at the surface of the liquid therein, while the pressure in the delivery chamber 6 will be communicated through the reservoir 15 and the gauge tube 20 to the chamber 19 at a point below the surface of the liquid therein. Since the supply pressure in the chamber 5 will always be greater than the delivery pressure in the chamber 6, said supply pressure acting on the surface of the liquid in the reservoir 19 will force said liquid up into the gauge tube 20 to such a height that the weight of the column of liquid in said gauge tube above the surface thereof in the reservoir 19 will be sufficient to balance the difference of pressure in the two chambers 5 and 6. A scale 21 adapted to indicate the height of the liquid in the tube 20 may be calibrated to indicate said difference of pressure.

Since the area of the orifice 7 is constant so long as the adjustment of the plug 8 is kept constant, the rate of flow through said orifice will correspond exactly to the difference of pressure in the two chambers 5 and 6 and since this difference of pressure is indicated by the height of the liquid column in the tube 20, the scale 21 may, if desired, be calibrated to read directly the rate of flow. By adjusting the plug 8, a given rate of flow may be adjusted to a certain point of indication upon the scale 21 so that such adjustment of the plug 8 may be used for properly fitting or calibrating the scale 21.

The scale 11 may also be calibrated to indicate rate of flow corresponding to a given indication on the scale 21. It will be seen that by means of the element 2, the pressure of the fluid may be regulated to a uniform value, that such uniform pressure acting upon the constant orifice 7 will insure a uniform flow of fluid therethrough and that the rate of said flow will be indicated by the height of the liquid column in the tube 20. The reservoir 15 also serves as a gas accumulation chamber to smooth out slight variations of pressure.

It is obvious that various changes may be made in the details of construction without departing from the spirit of this invention; it is, therefore, to be understood that this invention is not to be limited to the specific details shown and described.

Having thus described this invention, what is claimed is:

1. A device for indicating and controlling the flow of a fluid, comprising, a duct provided with a supply chamber and a delivery chamber connected by an orifice through which the fluid flows, an enlarged accumulation chamber, a conduit leading from said delivery chamber to said accumulation chamber, an outlet conduit leading from said accumulation chamber, adapted to conduct the fluid from said accumulation chamber, and differential fluid pressure indicating means connected to said supply chamber on one side and to said accumulation chamber on the other side.

2. A device for indicating and controlling the flow of a fluid, comprising, a duct provided with a supply chamber and a delivery chamber connected by an orifice through which the fluid flows, means for adjusting the size of said orifice, an enlarged accumulation chamber, a conduit leading from said delivery chamber to said accumulation chamber, an outlet conduit leading from said accumulation chamber, adapted to conduct the fluid from said accumulation chamber, and differential fluid pressure indicating means connected to said supply chamber on one side and to said accumulation chamber on the other side.

3. A device for indicating and controlling the flow of a fluid, comprising, a duct provided with a supply chamber and a delivery chamber connected by an orifice through which the fluid flows, an enlarged accumulation chamber, a conduit leading from said delivery chamber to said accumulation chamber, an outlet conduit leading from said accumulation chamber, adapted to conduct the fluid from said accumulation chamber, and means including a liquid column adapted to indicate the difference of fluid pressure between said supply chamber and said accumulation chamber.

4. A device for indicating and controlling the flow of a fluid, comprising, a duct provided with a supply chamber and a delivery chamber connected by an orifice through which the fluid flows, an enlarged accumulation chamber, means for regulating the flow of fluid to said supply chamber, a conduit leading from said delivery chamber to said accumulation chamber, an outlet conduit leading from said accumulation chamber, adapted to conduct the fluid from said accumulation chamber, and differential fluid pressure indicating means connected to said supply chamber on one side and to said accumulation chamber on the other side.

In testimony whereof I affix my signature this 13th day of Sept., 1920.

EDWARD C. WALKER.